US012732037B2

(12) United States Patent
Ye

(10) Patent No.: US 12,732,037 B2
(45) Date of Patent: Sep. 8, 2026

(54) ROTOR HOLDER, ROTOR ASSEMBLY, MOTOR, AND ELECTRIC TOOTHBRUSH

(71) Applicant: Shenzhen Shuye Technology Co., Ltd., Shenzhen (CN)

(72) Inventor: Hongxin Ye, Zhejiang Province (CN)

(73) Assignee: Shenzhen Shuye Technology Co., Ltd., Shenzhen (CN)

( * ) Notice: Subject to any disclaimer, the term of this patent is extended or adjusted under 35 U.S.C. 154(b) by 243 days.

(21) Appl. No.: 18/750,535

(22) Filed: Jun. 21, 2024

(65) Prior Publication Data

US 2025/0183738 A1 Jun. 5, 2025

(30) Foreign Application Priority Data

Dec. 5, 2023 (CN) ......................... 202311665960.5

(51) Int. Cl.

*H02K 1/274* (2022.01)
*H02K 7/00* (2006.01)
*H02K 11/215* (2016.01)
*A61C 17/22* (2006.01)

(52) U.S. Cl.

CPC ............. *H02K 1/274* (2013.01); *H02K 7/003* (2013.01); *H02K 11/215* (2016.01); *A61C 17/22* (2013.01); *H02K 2211/03* (2013.01)

(58) Field of Classification Search

CPC ...... H02K 1/274; H02K 7/003; H02K 11/215; H02K 2211/03; H02K 7/04; H02K 7/14; H02K 2213/03; H02K 1/30; H02K 1/278; H02K 5/24; A61C 17/22; A61C 17/34
See application file for complete search history.

(56) References Cited

U.S. PATENT DOCUMENTS 4,678,954 A 7/1987 Takeda et al.
6,940,199 B2 * 9/2005 Imamura ................ H02K 1/278 310/156.01
7,919,898 B2 * 4/2011 Wang ..................... H02K 1/276 310/216.127
11,699,931 B2 * 7/2023 Zou ...................... H02K 1/2766 310/156.01

FOREIGN PATENT DOCUMENTS

CN 109980821 A 7/2019
CN 110661346 A 1/2020
CN 113489193 A 10/2021
(Continued)

OTHER PUBLICATIONS

International search report of PCT/CN2024/073648.

*Primary Examiner* — Tulsidas C Patel
*Assistant Examiner* — Mohammed Ahmed Qureshi

(57) ABSTRACT

A rotor holder, a rotor assembly, a motor, and an electric toothbrush. The rotor holder includes a center shaft and a mounting portion. The mounting portion protrudes from an outer peripheral surface of the center shaft; wherein a surface of the mounting portion away from the center shaft defines a plurality of accommodation slots spaced around an axis of the center shaft. The surface of the mounting portion away from the center shaft further defines a material reduction slot, and a bottom of the material reduction slot extends around the axis of the center shaft and passes through a bottom wall surface of each of the plurality of accommodation slots.

28 Claims, 12 Drawing Sheets

(56) References Cited

FOREIGN PATENT DOCUMENTS

| | | | | |
|---|---|---|---|---|
| CN | 113489198 | A | 10/2021 | |
| CN | 113489199 | A | 10/2021 | |
| CN | 218771463 | U | 3/2023 | |
| CN | 218829560 | U | 4/2023 | |
| DE | 102006049866 | A1 | 4/2008 | |
| DE | 102016103310 | A1 | 9/2016 | |
| EP | 0871277 | B1 * | 1/2004 | ............. H02K 1/278 |
| JP | 2009512413 | A | 3/2009 | |
| JP | 2019083651 | A | 5/2019 | |
| TW | M298276 | U | 9/2006 | |

* cited by examiner

30

ROTOR HOLDER, ROTOR ASSEMBLY, MOTOR, AND ELECTRIC TOOTHBRUSH

CROSS REFERENCE

The present disclosure claims priority of Chinese Patent Application No. 202311665960.5, filed on Dec. 5, 2023, the entire contents of which are hereby incorporated by reference in their entirety.

TECHNICAL FIELD

The present disclosure relates to the technical field of small motors, and more specifically to a rotor holder, a rotor assembly, a motor, and an electric toothbrush.

BACKGROUND

A Motor is driven by electricity to achieve rotational movement of its rotor. In common applications, the motor rotates forward for a long period of time, or stopped and then reversed for a long period of time, in which case the rotor is subjected to less angular acceleration.

An electric toothbrush is a portable electronic device, and the motor applied to the portable electronic device is small in size. In the technical field of electric toothbrushes, such as ultrasonic electric toothbrushes, the motor is not only required to be small in size but also rotate forward and reverse at high frequencies. The Chinese Patent No. CN215498605U, in the title of "ELECTRIC TOOTHBRUSH MOTOR AND ELECTRIC TOOTHBRUSH", discloses an electric toothbrush with a motor that operates at a high frequency of forward and reverse rotation. However, in this patent, the rotor is required to be reset with the aid of an elastic reset member for forward and reverse rotation, which largely restricts the rotor's rotational frequency.

With the development of technology, an electric toothbrush, where the rotor can be reset for forward and reverse rotation without the aid of an elastic reset member, has appeared, and the forward and reverse rotation frequency of the rotor of this electric toothbrush is as high as 66,000 times/minute.

In high-frequency forward and reverse applications, the angular acceleration that the rotor holder has to withstand is large. In order to adapt to this working condition, the motor applied to the electric toothbrush has been configured with a reduced ratio of the outer diameter to the axial dimension, in order to reduce the rotational inertia. However, the power required to maintain the normal operation of the motor is still large, and in the case of high-frequency forward and reverse rotations, the actual angular displacement differs from the preset angular displacement. That is, there exists a large attenuation of the rotational amplitude.

SUMMARY OF THE DISCLOSURE

The main purpose of the present disclosure is to propose a rotor holder, a rotor assembly, a motor, and an electric toothbrush, aiming to solve the technical problem that the existing motor holder has a large rotational inertia, and has a high degree of attenuation of the rotational amplitude and requires a large amount of power applied to high-frequency forward and reverse rotating conditions.

In order to realize the above purpose, the present disclosure proposes a motor bracket, including: a center shaft; and a mounting portion, protruding from an outer peripheral surface of the center shaft; wherein a surface of the mounting portion away from the center shaft defines a plurality of accommodation slots spaced around an axis of the center shaft; wherein the surface of the mounting portion away from the center shaft further defines a material reduction slot, and a bottom of the material reduction slot extends around the axis of the center shaft and passes through a bottom wall surface of each of the plurality of accommodation slots.

In some embodiment, the material reduction slot extends around the axis of the center shaft in a full circle and is in an annular shape.

In some embodiment, a bottom wall surface of the material reduction slot is a rotary surface coaxial with the center shaft.

In some embodiment, the bottom wall surface of the material reduction slot is a cylindrical surface.

In some embodiment, an outer diameter of the bottom wall surface of the material reduction slot is R1, and an outer diameter of a shaft section of the center shaft near the mounting portion is R2, with R1 being greater than or equal to R2.

In some embodiment, a minimum distance between each adjacent two of the plurality of accommodation slots in a circumferential direction extending around the axis of the center shaft is D1, and a minimum distance from the bottom wall surface of each of the plurality of accommodation slots to the outer peripheral surface of the center shaft is D2, with D1 being greater than D2.

In some embodiment, the mounting portion includes a plurality of silicon steel sheets affixed along the axis of the center shaft, D2 being greater than or equal to 5 mm.

In some embodiment, the mounting portion and the center shaft are in a one-piece structure.

In some embodiment, a length of the mounting portion is L1, a distance between a front end surface of the mounting portion and a front end surface of the center shaft is L2, and a value of L1:L2 is in a range of [0.8, 2.5].

In some embodiment, the front end surface of the mounting portion is arranged with a chamfer at a connection with the outer peripheral surface of the center shaft.

In some embodiment, the material reduction slot includes a plurality of material reduction slots spaced apart along the axis of the center shaft.

In some embodiment, the plurality of material reduction slots are arranged at equal intervals along the axis of the center shaft.

In some embodiment, an axial width of each material reduction slot is equal.

In some embodiment, the axial width of each material reduction slot is W1, and a spacing between each adjacent two of the plurality of material reduction slots in a direction extending along the axis of the center shaft is W2, with W1 being less than W2.

In some embodiment, axial widths of the plurality of material reduction slots are set decreasing from front to back.

In some embodiment, the plurality of material reduction slots are numerically arranged densely in front and sparsely in back along the axis of the center shaft.

The present disclosure further provides a rotor assembly, including: the rotor holder as above and a plurality of magnets; wherein the plurality of magnets are fixedly disposed in the plurality of accommodation slots, the plurality of magnets cover a portion of the material reduction slot, and the plurality of magnets are spaced apart from a bottom wall surface of the material reduction slot.

In some embodiment, each of the plurality of accommodation slots extends along the axis of the center shaft in an elongate shape and passes through a front end surface and/or a rear end surface of the mounting portion, and the plurality of magnets are axially assembled in the plurality of accommodation slots.

In some embodiment, each accommodation slot is arranged with some of the plurality of magnets spliced in an axial direction.

In some embodiment, a splicing seam of each adjacent two of the plurality of magnets in a direction extending along the axis of the center shaft is set off from the material reduction slot.

In some embodiment, an axial length of the some of the plurality of magnets is greater than an axial length of a corresponding accommodation slot, and the some of the plurality of magnets protrude from the front end surface and/or a rear end surface of the mounting portion along the axial direction.

In some embodiment, the rotor assembly further includes a filler disposed in the material reduction slot, a density of the filler being less than a density of the mounting portion.

In some embodiment, an outer side of each of the plurality of magnets protrudes from an outer peripheral surface of the mounting portion, and an outer surface of the filler is flush with the outer peripheral surface of the mounting portion.

In some embodiment, the filler is an adhesive that securely connects the plurality of magnets to the mounting portion.

The present disclosure further provides a motor, including: a housing, a stator assembly, and the rotor assembly as above.

In some embodiment, the motor further includes a detection assembly, the detection assembly including a circuit board and a plurality of Hall sensors electrically connected to the circuit board; wherein the plurality of Hall sensors are coupled to a magnetic marker on the rotor assembly.

In some embodiment, the detection assembly is disposed on a rear end of the housing, and the housing defines a lead hole between the detection assembly and the stator assembly; the lead hole is configured for leads of the detection assembly and the stator assembly to pass out of the housing.

The present disclosure further provides an electric toothbrush, including: a handle, the motor as above, and a brush head; wherein the motor is disposed in an inner cavity of the handle, the center shaft of the rotor assembly extends to a front end of the handle, and the brush head is arranged on a front end of the center shaft.

The provision of the material reduction slot may reduce the mass of the rotor holder. In particular, the bottom of the material reduction slot extends toward the accommodation slot, which not only further reduces the mass, but also:

1, the support strength of the accommodation slot is not weakened compared to the axial extension along the center shaft;

2, the magnetic conductivity of the mounting portion is not weakened when the mounting portion is made of a ferromagnetic material;

3, the interconnection of the material reduction slot and the accommodation slot further makes the rotor holder 31 easier to process.

The rotor holder of the present disclosure has a smaller mass and therefore a smaller moment of inertia, which results in a lower attenuation of the rotational amplitude and a lower power requirement when applied to high-frequency forward and reverse rotational conditions.

BRIEF DESCRIPTION OF THE DRAWINGS

To more clearly illustrate the technical solutions of the embodiments of the present disclosure, the accompanying drawings of the embodiments will be briefly described below, and it will be apparent that the accompanying drawings in the following description relate only to some embodiments of the present disclosure and other drawings may be obtained from these drawings by those skilled in the art without creative labor.

DETAILED DESCRIPTION

Figure 1:
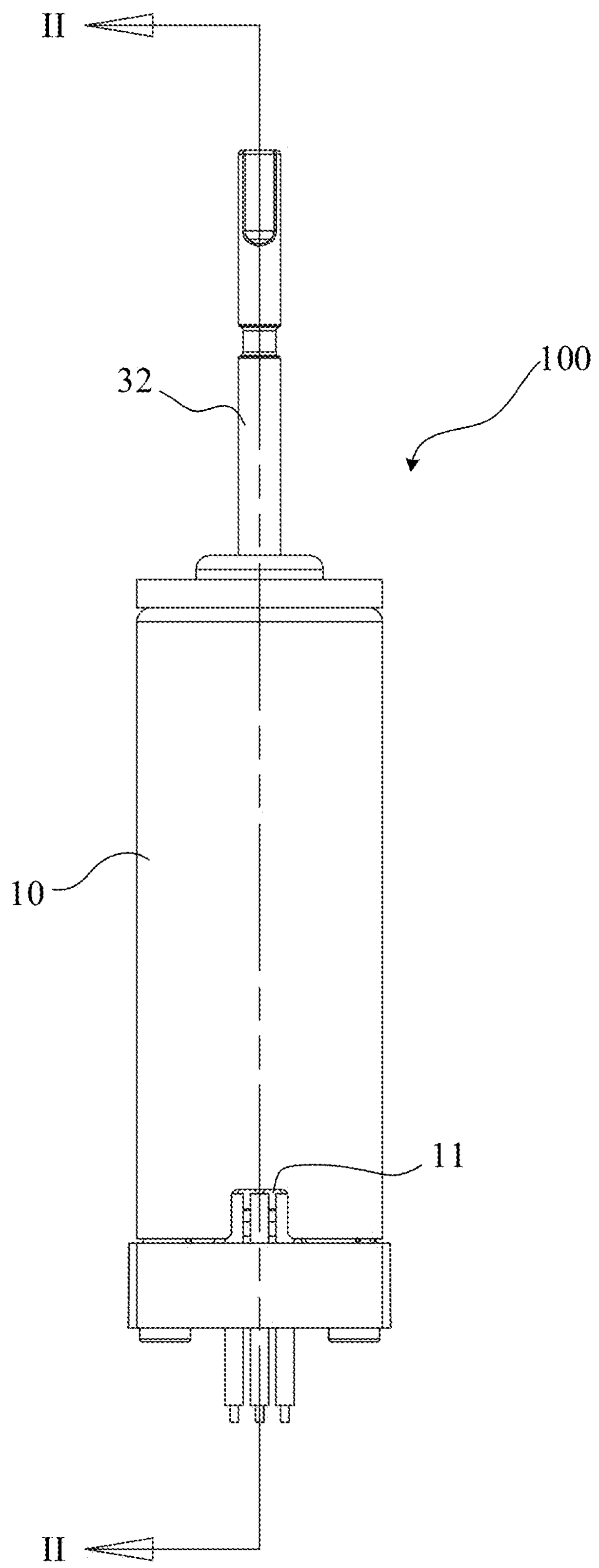
FIG. 1 is a front structural schematic view of a motor according to some embodiments of the present disclosure.
Figure 2:
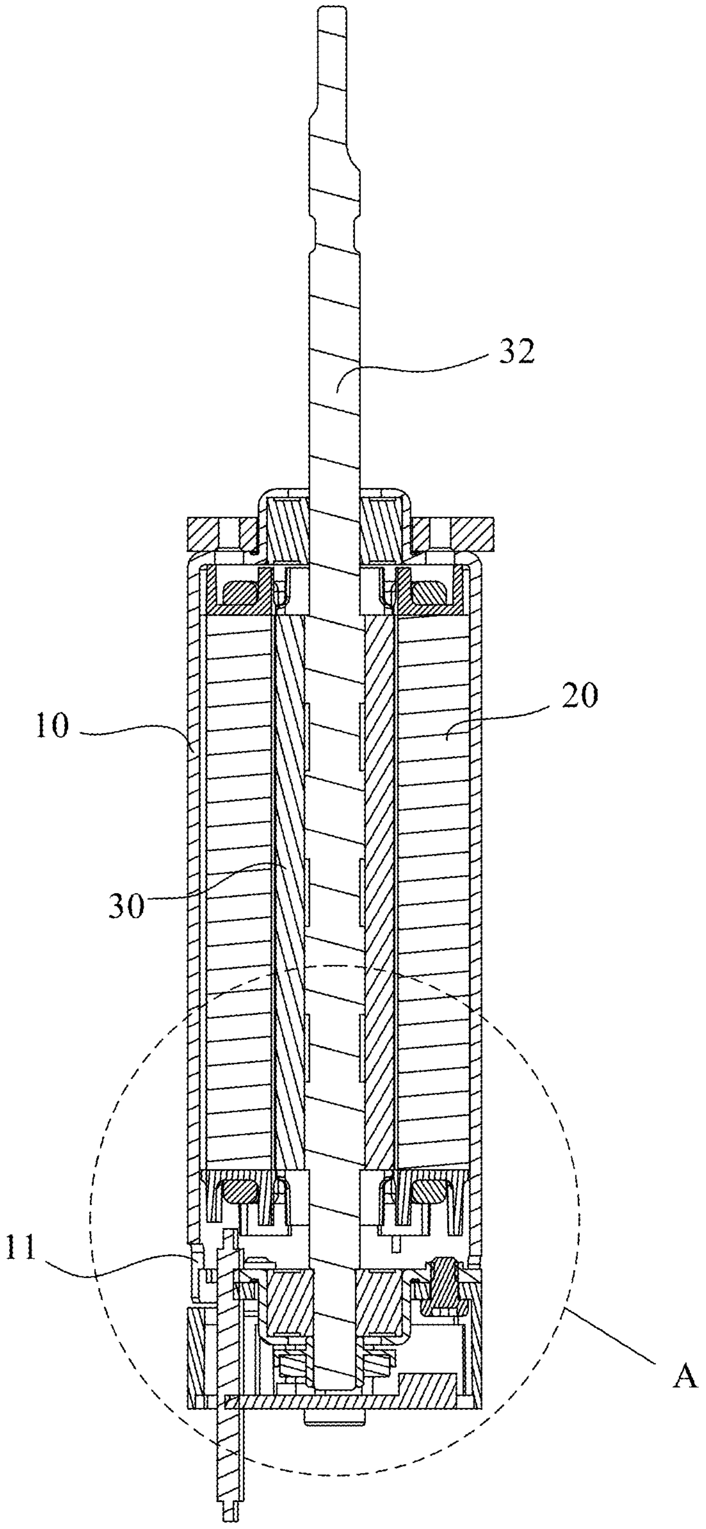
FIG. 2 is a cross-sectional schematic view of FIG. 1 along II-II.

The technical solutions in the embodiments of the present disclosure will be described clearly and completely in the following in conjunction with the accompanying drawings in the embodiments of the present disclosure, and it is obvious that the described embodiments are only a part of the embodiments of the present disclosure and not all of the embodiments. Based on the embodiments in the present disclosure, all other embodiments obtained by those skilled in the art without making creative labor fall within the scope of the present disclosure.

Referring to FIGS. 5 to 10, in some embodiments, a rotor holder 31 includes:

a center shaft 32;

a mounting portion 33, protruding from an outer peripheral surface of the center shaft 32; where a surface of the mounting portion 33 away from the center shaft 32 defines multiple accommodation slots 34 spaced around an axis of the center shaft 32;

where the surface of the mounting portion 33 away from the center shaft 32 further defines a material reduction slot 35, and a bottom of the material reduction slot 35 extends around the axis of the center shaft 32 through a bottom wall surface of the accommodation slot 34.

In the embodiments, the varying magnetic field drives the rotor assembly 30 to rotate, and the center shaft 32 is configured for transmitting the rotational motion. For example, in an application to an electric toothbrush, a front end of the center shaft 32 is configured for mounting a brush head.

The mounting portion 33 is configured to arrange a magnet 36*a* of the rotor assembly 30 through the accommodation slot 34; the mounting portion 33 may be made of a ferromagnetic material, such as a material with high permeability, low iron loss, and low hysteresis, so as to enhance the efficiency of utilizing the magnetic energy, for converting a greater proportion of the magnetic energy into kinetic energy.

Since the provision of the accommodation slot 34 will not occupy the outer peripheral surface of the mounting portion 33 in its entirety, the material reduction slot 35 may be provided in another region of the outer peripheral surface of the mounting portion 33. The provision of the material reduction slot 35 may reduce the mass of the rotor holder 31. In particular, the bottom of the material reduction slot 35 extends toward the accommodation slot 34, which not only further reduces the mass, but also:

1, the support strength of the accommodation slot 34 is not weakened compared to the axial extension along the center shaft 32;

2, the magnetic conductivity of the mounting portion 33 is not weakened when the mounting portion 33 is made of a ferromagnetic material;

3, the interconnection of the material reduction slot 35 and the accommodation slot 34 further makes the rotor holder 31 easier to process.

The rotor holder 31 of the present disclosure has a smaller rotational moment of inertia due to its reduced mass, which results in a lower attenuation of the rotational amplitude and a lower power requirement when applied to high-frequency forward and reverse rotational conditions.

Further, the material reduction slot 35 extends around the axis of the center shaft 32 in a full circle and is in the form of a ring. In the embodiments, the mass of the rotor holder 31 is further reduced, and the annular shape of the material reduction slot 35 is conducive to machining and better dynamic balance during movement. In some embodiments, the bottom wall surface of the material reduction slot 35 is a rotary surface coaxial with the center shaft 32. Further, the bottom wall surface of the material reduction slot 35 is a cylindrical surface.

Figure 3:
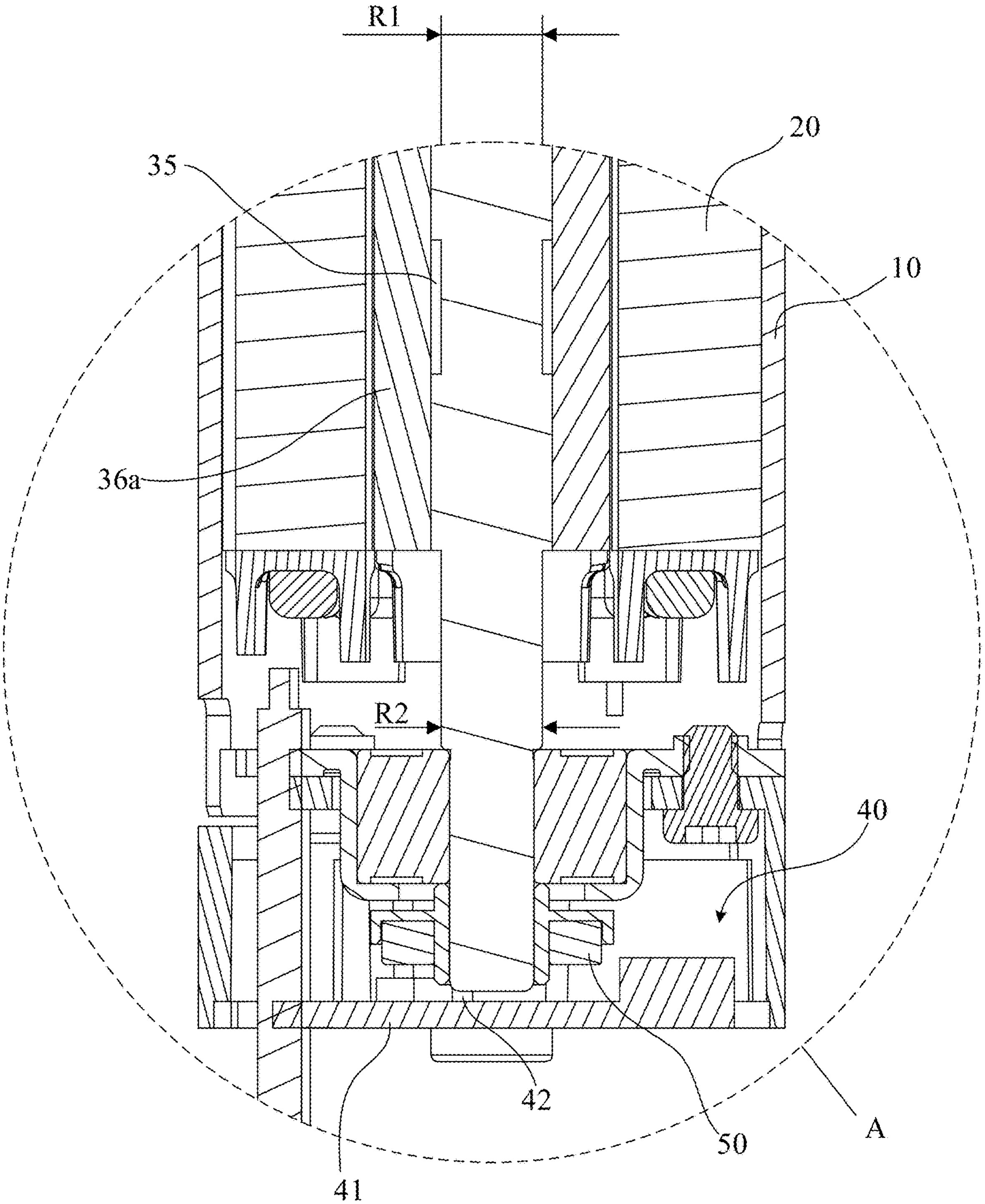
FIG. 3 is a partially enlarged view at area A in FIG. 2.

Further, referring to FIG. 3 together, the outer diameter of the bottom wall surface of the material reduction slot 35 is R1, and the outer diameter of a shaft section of the center shaft 32 near the mounting portion 33 is R2, with R1 being greater than or equal to R2. In the embodiments, by restricting the size of R2, the provision of the material reduction slot 35 may be avoided from weakening the bending resistance of the rotor holder 31. Moreover, when the mounting portion 33 is formed by stacking multiple silicon steel sheets, such a setting further facilitates the formation of a closed socket hole and the connection of wings of the mounting portion 33, which reduces the number of parts and thus facilitates assembly.

Figure 7:
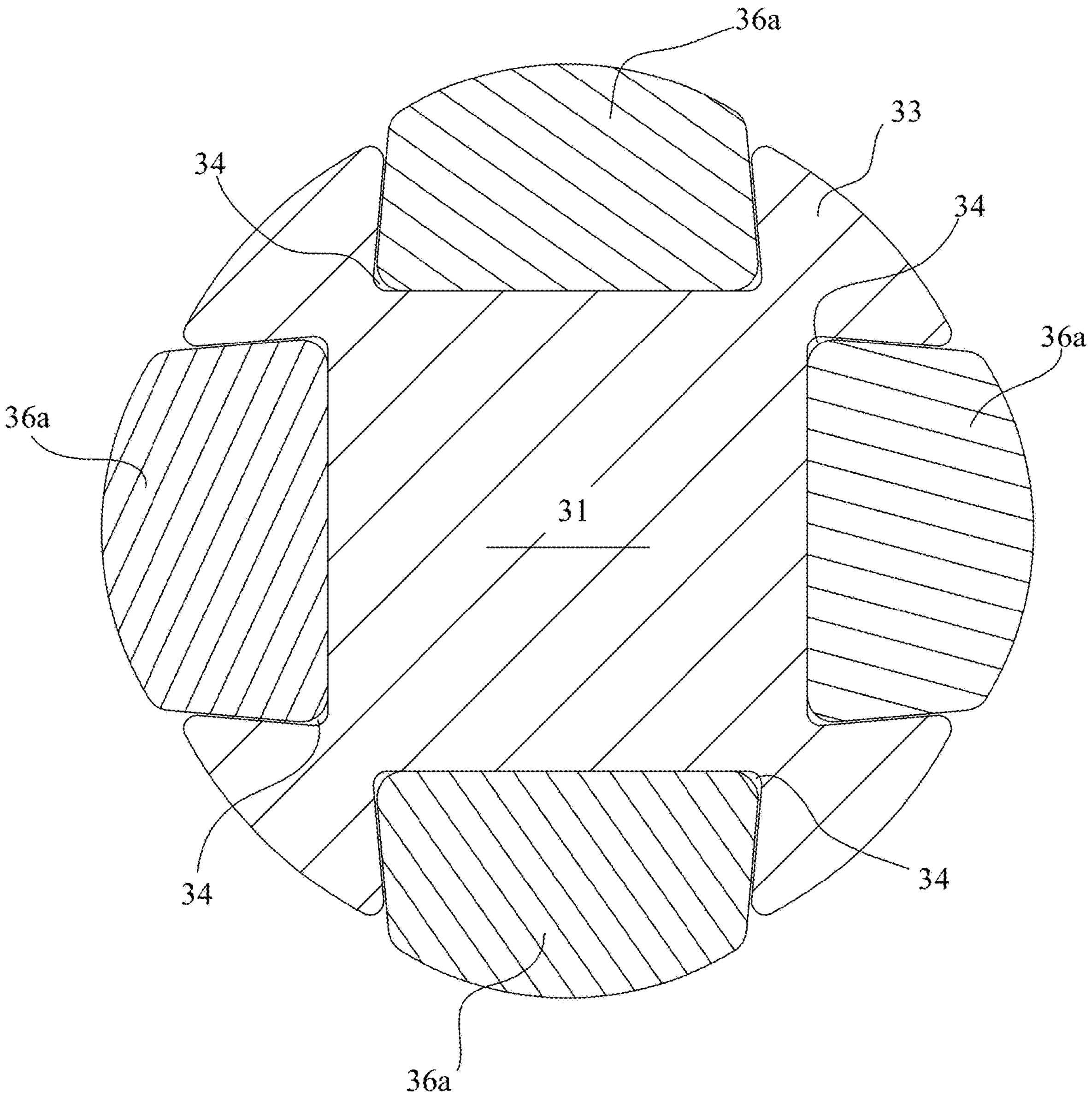
FIG. 7 is a cross-sectional schematic view of FIG. 6 along II-II.
Figure 8:
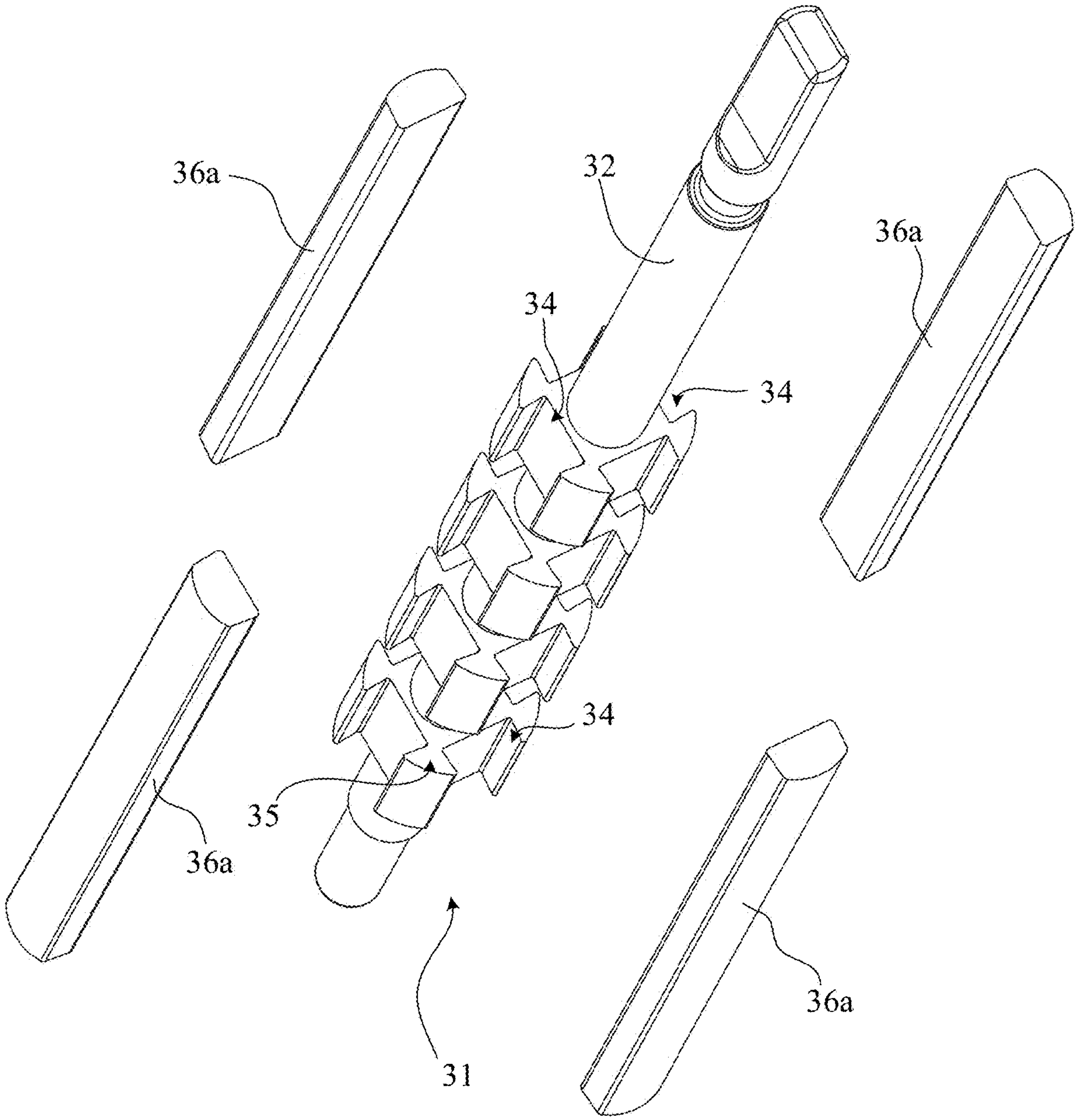
FIG. 8 is an exploded structural schematic view of the rotor assembly in FIG. 5.
Figure 9:
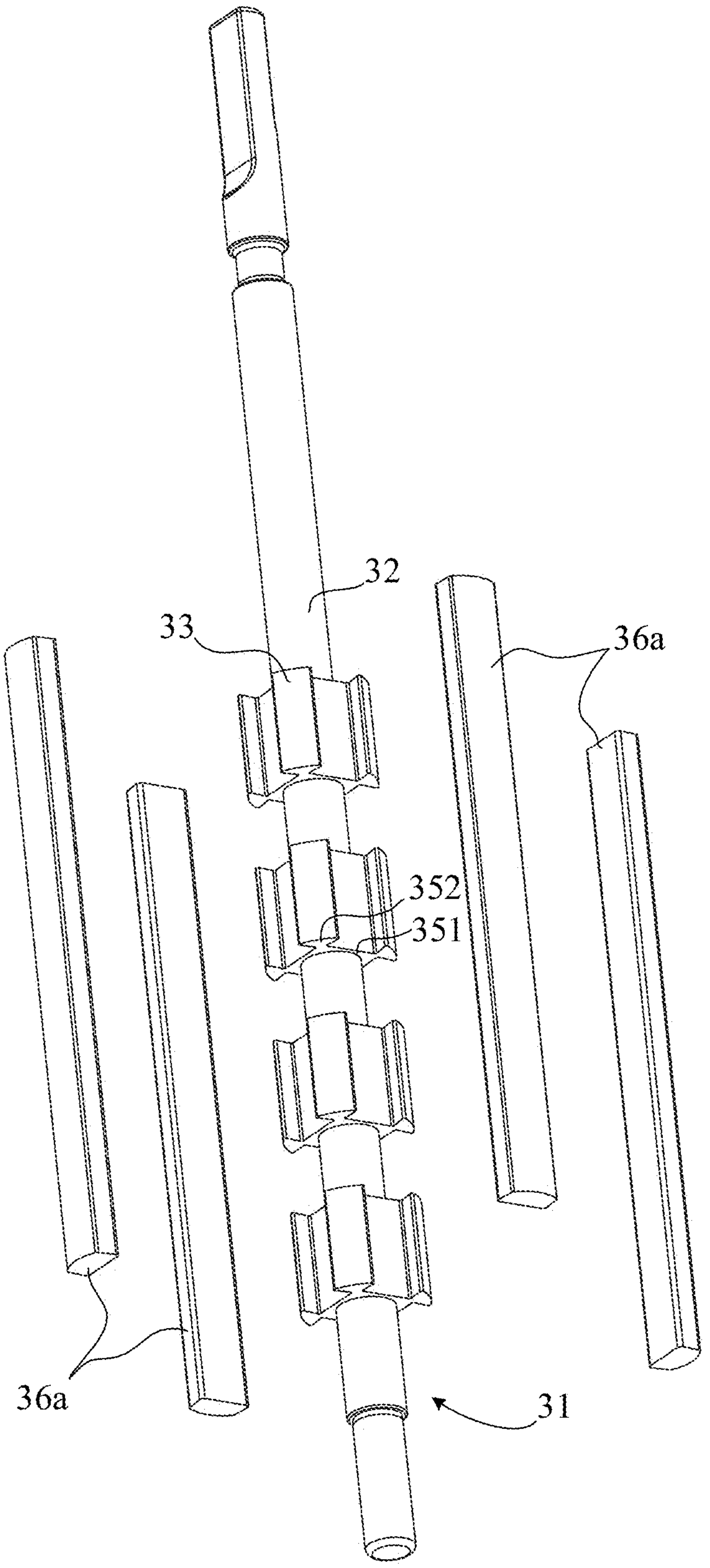
FIG. 9 is an exploded structural schematic view of the rotor assembly in FIG. 5 at another viewing angle.
Figure 10:
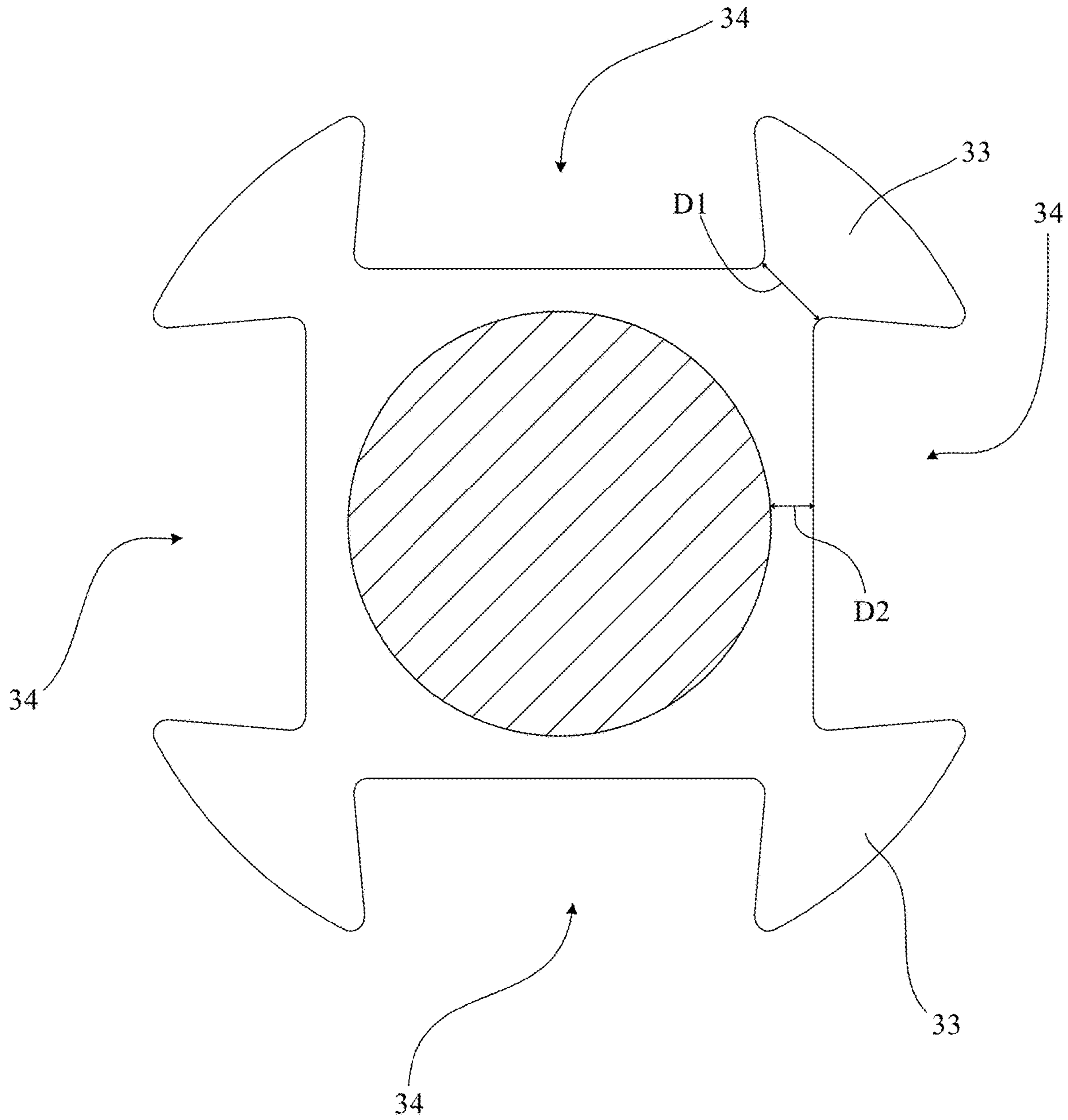
FIG. 10 is a structural schematic view of a transverse section of the rotor holder in FIG. 5.

Further, referring to FIGS. 7 and 10 together, the minimum distance between two adjacent accommodation slots 34 in a circumferential direction extending around the axis of the center shaft 32 is D1, and the minimum distance from the bottom wall surface of the accommodation slots 34 to the outer peripheral surface of the center shaft 32 is D2, with D1 being greater than D2, which is conducive to ensuring the support strength of the accommodation slots 34 and preventing deformation of the parts between the two adjacent accommodation slots 34 in the circumferential direction when assembling the magnet 36*a*, such that the assembly is easier to carry out. In some embodiments, the mounting portion 33 includes multiple silicon steel sheets affixed along the axis of the center shaft 32, D2 being greater than or equal to 5 mm. The silicon steel sheets are formed by plate blanking, and the multiple silicon steel sheets socketed with the center shaft 32 may reduce the processing cost. In addition, the silicon steel sheets have the material characteristics of high magnetic permeability, low iron loss, and low hysteresis, which is conducive to enhancing the efficiency of magnetic energy utilization.

Further, the mounting portion 33 and the center shaft 32 are in a one-piece structure, which is conducive to ensuring the overall structural strength of the rotor holder 31. Specifically, the one-piece rotor holder 31 may be prepared by a center-walking CNC machine tool, which can also be called a spindle box moving CNC automatic lathe, an economic turning and milling machine tool, or a longitudinal cutting lathe, which belongs to precision machining equipment and can complete turning, milling, drilling, boring, tapping, engraving and other composite processing in a single process, mainly used for batch processing of precision hardware, shafts shaped non-standard parts, etc.), wherein low wire moving speeds are applicable.

Further, the length of the mounting portion 33 is L1, the distance between a front end surface of the mounting portion 33 and a front end surface of the center shaft 32 is L2, and the value of L1:L2 is in [0.8, 2.5], which may ensure the bending resistance of the rotor holder 31, thereby ensuring the reliability of the rotor holder 31 for a long time.

Further, in order to disperse the stress, the front end surface of the mounting portion 33 is arranged with a chamfer at a connection with the outer peripheral surface of the center shaft 32.

Further, the material reduction slots 35 are spaced apart in a plurality along the axis of the center shaft 32, such that a larger number of magnets 36*a* can be arranged to control the rotation of the rotor assembly 30 more efficiently and finely.

Further, the multiple material reduction slots 35 are arranged at equal intervals along the axis of the center shaft 32 so as to make the rotor holder 31 easier to machine. In some embodiments, the axial widths of the material reduction slots 35 are equal.

Further, in order to better strike a balance between reducing mass and ensuring structural strength, the axial width of each material reduction slot 35 is W1, and the spacing between two adjacent material reduction slots 35 in the direction extending along the axis of the center shaft 32 is W2, with W1 being less than W2.

Further, in order to enhance the use comfort of the portable electronic device, the axial widths of the material reduction slots 35 are set decreasing from front to back, such that the center of mass of the rotor holder 31 is further away from a front end of the center shaft 32, which may reduce the gripping torque of the portable electronic device, for example, the gripping of the portable electronic device, such as an electric toothbrush, is more labor-saving.

Further, the multiple material reduction slots 35 are numerically arranged densely in front and sparsely in back along the axis of the center shaft 32, and this arrangement also allows the center of mass of the rotor holder 31 to be further away from the front end of the center shaft 32, thereby making the holding of the portable electronic device more effortless.

Referring to FIGS. 5 to 10, in some embodiments, the present disclosure further proposes a rotor assembly 30, including a rotor holder 31 and a magnet 36*a*; where the rotor holder 31 may be as described above, the magnet 36*a* is fixedly disposed in the accommodation slot 34, the magnet 36*a* covers a portion of the material reduction slot 35, and the magnet 36*a* is spaced apart from the bottom wall surface of the material reduction slot 35. The specific structure of the rotor holder 31 is referred to the above embodiments. Since the present rotor assembly 30 is adopted with all the technical solutions of all the above embodiments, it also has all the beneficial effects brought about by the technical solutions of the above embodiments, which will not be repeated herein. In the embodiments, the magnet 36*a* may be a permanent magnet 36*a*, and the magnets 36*a* of different orientations have different magnetic poles.

Further, the accommodation slot 34 extends along the axis of the center shaft 32 in an elongate shape and passes through the front and/or rear end surface of the mounting portion 33, and the magnet 36*a* is axially assembled in the accommodation slot 34. In the embodiments, the accommodation slot 34 is in an elongate shape so as to avoid the increase of radial size and increase of rotational inertia. Since the accommodation slot 34 is open on at least one side in the axial direction, the magnet 36*a* can be assembled to the accommodation slot 34 along the axial opening, which may improve the assembly efficiency.

Figure 11:
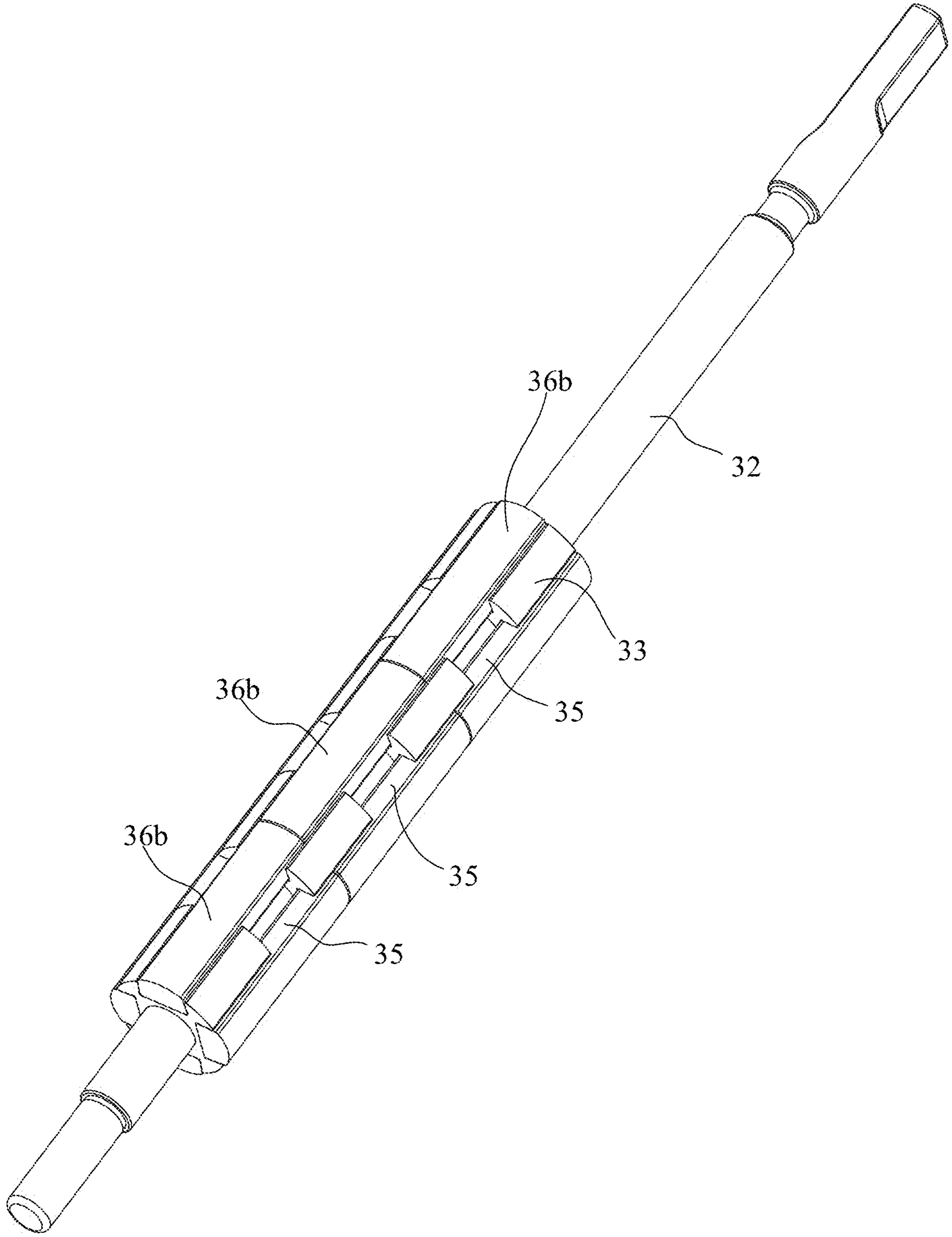
FIG. 11 is a structural schematic view of a rotor assembly according to other embodiments of the present disclosure.
Figure 12:
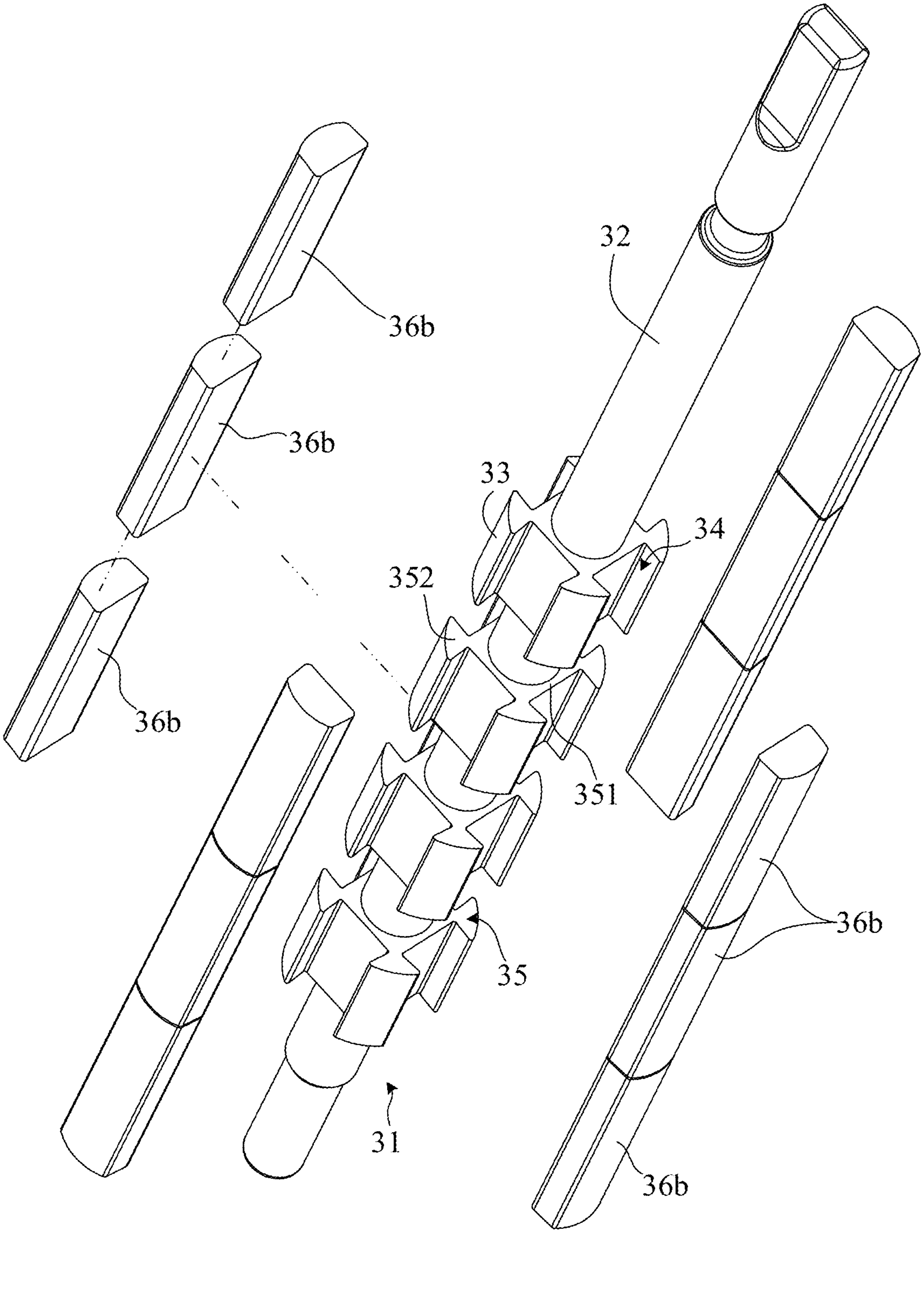
FIG. 12 is a cross-sectional schematic view of the rotor assembly in FIG. 11.

Referring to FIGS. 11 and 12, in other embodiments, each accommodation slot 34 is arranged with multiple magnets 36*b* spliced in the axial direction, such that the axial size of each magnet 36*b* can be smaller and thus not prone to accidental breakage. Moreover, in a case where the accommodation slot 34 is open on both sides in the axial direction, the multiple magnets 36*b* can be assembled to the accommodation slots 34 along the axial direction in both the forward and reverse directions, which is conducive to enhancing the assembly efficiency.

Further, a splicing seam of two adjacent magnets 36*b* in the direction extending along the axis of the center shaft 32 may be set off from the material reduction slot 35, such that the multiple spliced magnets 36*b* may be better supported to avoid buckling at the end.

Referring to FIGS. 5 to 12, in the above two embodiments, the axial length of the magnets 36*a*, 36*b* is greater than the axial length of the accommodation slot 34, and the magnets 36*a*, 36*b* protrude from the front end surface and/or the rear end surface of the mounting portion 33 along the axial direction, which allows for a more adequate cutting of the magnetic force and thus improves the efficiency of magnetic energy utilization.

Further, the rotor assembly 30 further includes a filler disposed in the material reduction slot 35, the density of the filler being less than the density of the mounting portion 33. In the embodiments, the filler may reduce the skeletonized area of the rotor assembly 30, thereby reducing wind resistance and noise during rotation.

Further, an outer side of each of the magnets 36*a*, 36*b* protrudes from the outer peripheral surface of the mounting portion 33, and an outer surface of the filler is flush with the outer peripheral surface of the mounting portion 33, such that the interference between the mounting portion 33, the filler, and the stator assembly 20 may be avoided, and further, the wind resistance and noise during operation may be further reduced.

Further, since the magnets 36*a*, 36*b* will be subjected to large inertial forces during operation, such as radially outward and circumferentially around the axis of the center axis 32, the filler may be an adhesive that securely connects the magnets 36*a*, 36*b* to the mounting portion 33, which may prevent the magnets 36*a*, 36*b* from falling off.

Referring to FIGS. 5 to 10, in order to prevent the magnet 36*a* from coming loose along the radial direction of the center shaft 32, in some embodiments, the present disclosure further proposes a rotor assembly 30, applied to the motor 100 of the portable electronic device; where the rotor assembly 30 includes a rotor holder 31 and a magnet 36*a*, the rotor holder 31 including a center shaft 32 and a mounting portion 33 protruding from an outer peripheral surface of the center shaft 32; a surface of the mounting portion 33 away from the center shaft 32 defines multiple accommodation slots 34 spaced around an axis of the center shaft 32; the magnet 36*a* is fixedly disposed in the accommodation slot 34; the accommodation slot 34 extends along the axis of the center shaft 32 in an elongated shape and passes through the front and/or rear end surfaces of the mounting portion 33; the width of a cross-sectional shape of the accommodation slot 34 tapers outwardly in the radial direction; the magnet 36*a* is assembled in the axial direction in the accommodation slot 34. The specific structure of the rotor holder 31 refers to the above embodiments, and since the present rotor assembly 30 is adopted with all of the technical solutions of all of the above embodiments, it also has all of the beneficial effects brought about by the technical solutions of the above embodiments, which will not be repeated herein.

In the embodiments, the varying magnetic field drives the rotor assembly 30 to rotate, and the center shaft 32 is configured for transmitting the rotational motion. For example, in an application to an electric toothbrush, a front end of the center shaft 32 is configured for mounting a brush head.

The mounting portion 33 is configured to arrange the magnet 36*a* of the rotor assembly 30 through the accommodation slot 34, the mounting portion 33 may be made of a ferromagnetic material, such as a material with high permeability, low iron loss, and low hysteresis, so as to enhance the efficiency of utilizing the magnetic energy, for converting a greater proportion of the magnetic energy into kinetic energy.

Since the width of the cross-sectional shape of the accommodation slot 34 is provided in a tapering manner in the radially outward direction, the magnet 36*a* may be restricted from slipping out in the radially outward direction.

Further, in order to facilitate machining of the accommodation slot 34 on the rotor holder 31 having a small ratio of the outer diameter to the axial size, the wall surfaces on both sides of the accommodation slot 34 facing each other are arranged inclined with respect to the bottom wall surface of the accommodation slot 34. In some embodiments, two opposite sides of the cross-sectional shape of the accommodation slot 34 are symmetrically arranged in order to better obtain dynamic balance.

Further, in order to strengthen the fixation of the magnet 36*a*, the bottom wall surface of the accommodation slot 34 is arranged with an adhesive reservoir; the magnet 36*a* covers the adhesive reservoir, and the rotor assembly 30 further includes an adhesive filled between the magnet 36*a* and a bottom wall surface of the adhesive reservoir, and the adhesive fixedly connects the magnet 36*a* with the mounting portion 33.

Further, in order to reduce the rotational inertia of the rotor holder 31, the surface of the mounting portion 33 away from the center shaft 32 further defines a skeletonized slot. To facilitate processing and further reduce the rotational inertia of the rotor holder 31, the skeletonized slot is in communication with the adhesive reservoir, and the adhesive is further filled in the skeletonized slot; the density of the filler is less than the density of the mounting portion 33.

Further, in order to avoid interference between the rotor assembly 30 and the stator assembly 20 and to reduce air resistance and noise, an outer side of the magnet 36*a* protrudes from the outer peripheral surface of the mounting portion 33, and an outer surface of the filler is flush with the outer peripheral surface of the mounting portion 33.

Referring to FIGS. 11 and 12, in other embodiments, in the circumferential direction extending around the axis of the center shaft 32, the adhesive reservoir and the skeletonized slot are connected to each other on both ends to form a ring shape, so as to make the processing of the adhesive reservoir and the skeletonized slot simpler; multiple axially spliced magnets 36*b* are arranged in each of the accommodation slots 34, and the splicing seam of the two adjacent magnets 36*b* are arranged away from the adhesive reservoir in the direction extending along the axis of the center shaft 32, such that the length of each magnet 36*b* can be prevented from being too large and thus not prone to accidental breakage. Moreover, in a case where the accommodation slot 34 is open on both sides in the axial direction, the multiple magnets 36*b* can be assembled to the accommodation slots 34 along the axial direction in both the forward and reverse directions, and the splicing seam of the magnets 36*b* is arranged away from the adhesive reservoir so as to enable the spliced magnets 36*b* to be better supported and to avoid buckling of the ends.

Referring to FIGS. 7 and 10, in the circumferential direction extending around the axis of the center shaft 32, the adhesive reservoir and the skeletonized slot are connected to each other on both ends to form a ring shape; in the circumferential direction extending around the axis of the center shaft 32, the minimum distance between adjacent two accommodating slots 34 is D1, and the minimum distance between the bottom wall surface of the accommodating slots 34 and the outer peripheral surface of the center shaft 32 is D2, where D1 is greater than D2, thereby ensuring the support strength of the accommodating slots 34. In addition, parts between the two adjacent accommodation slots 34 in the circumferential direction are less prone to deformation when the magnets 36*a* are assembled, such that the assembly is easier to carry out.

Referring to FIGS. 1 to 4, the present disclosure further proposes a motor 100 including a housing 10, a stator assembly 20, and a rotor assembly 30; where the rotor assembly 30 may be as described above, the rotor assembly 30 being structured with reference to the above-described embodiments. Since the present motor 100 is adopted with all of the technical solutions of all of the above-described embodiments, it likewise possesses all the beneficial effects brought by the technical solutions of the above-described embodiments, which will not be repeated herein. In the embodiments, the housing 10 is configured to to provide support as well as protection for components inside the housing 10, and the stator assembly 20 typically includes a winding frame and a coil winding wound on the winding frame.

Further, the motor 100 includes a detection assembly 40, where the detection assembly 40 includes a circuit board 41 and multiple Hall sensors 42 electrically connected to the circuit board 41, the Hall sensors 42 being coupled to a magnetic marker 50 on the rotor assembly 30.

Figure 4:
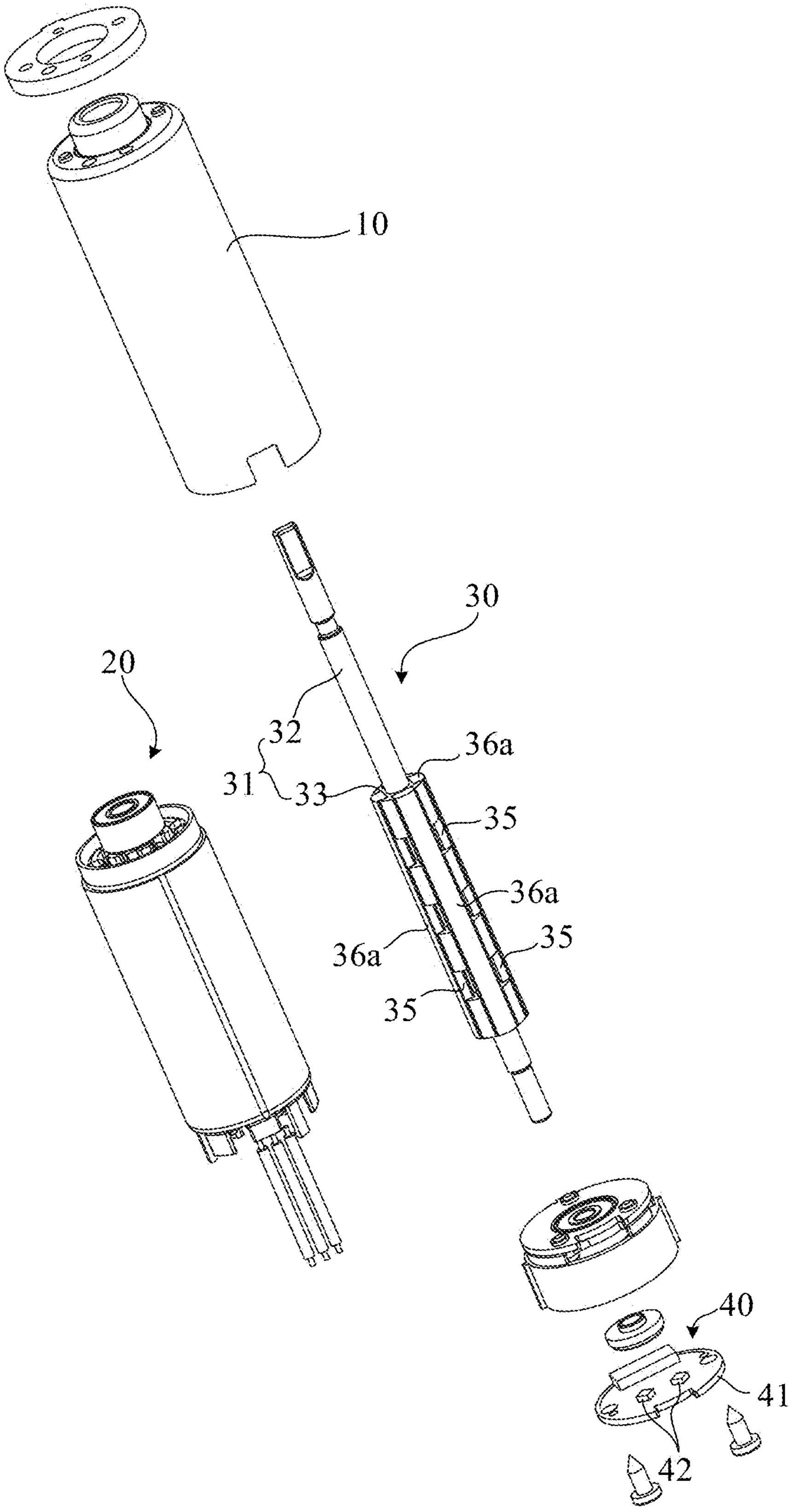
FIG. 4 is an exploded structural schematic view of the motor in FIG. 1.
Figure 5:
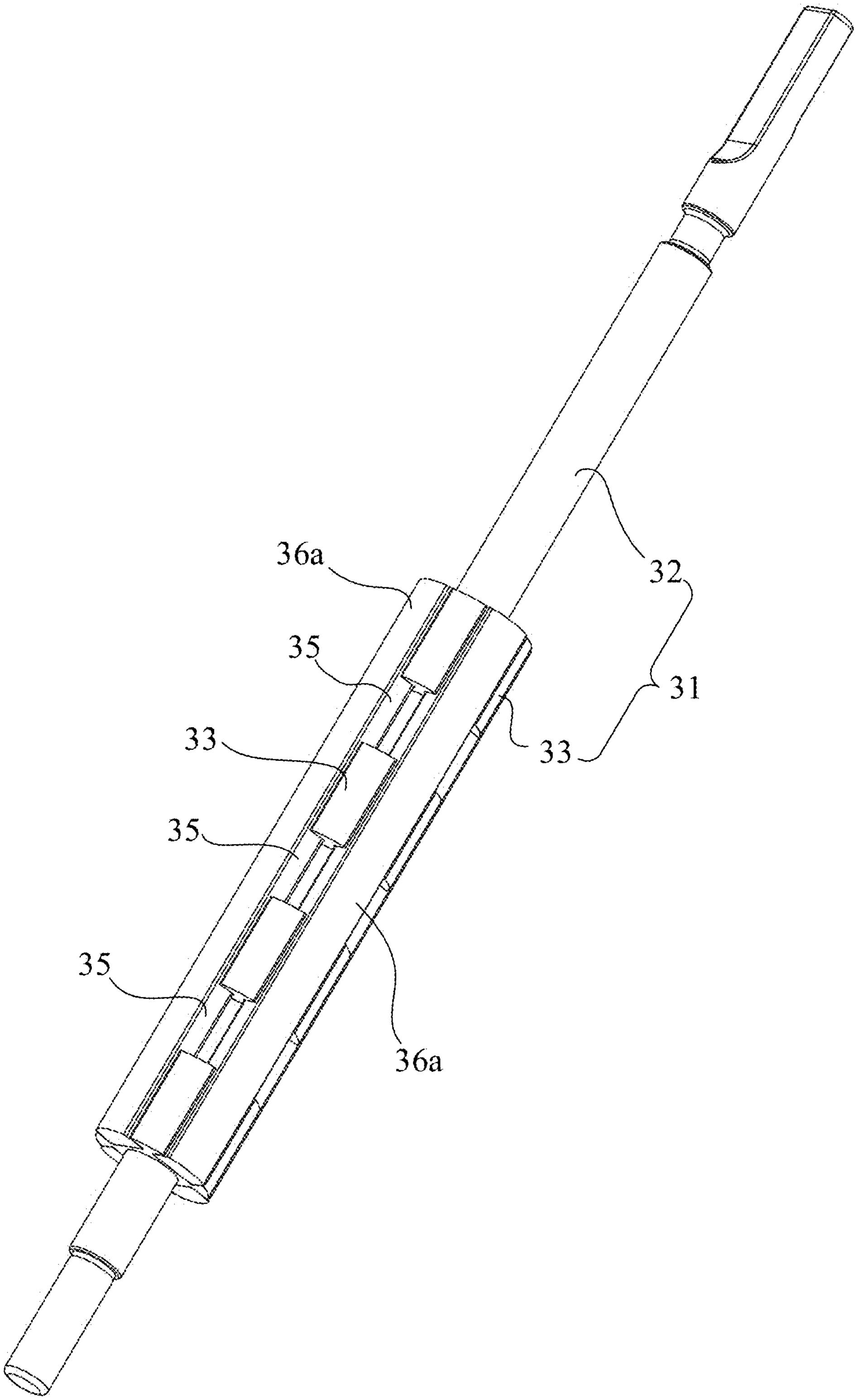
FIG. 5 is a partially enlarged view of a rotor assembly in FIG. 4.
Figure 6:
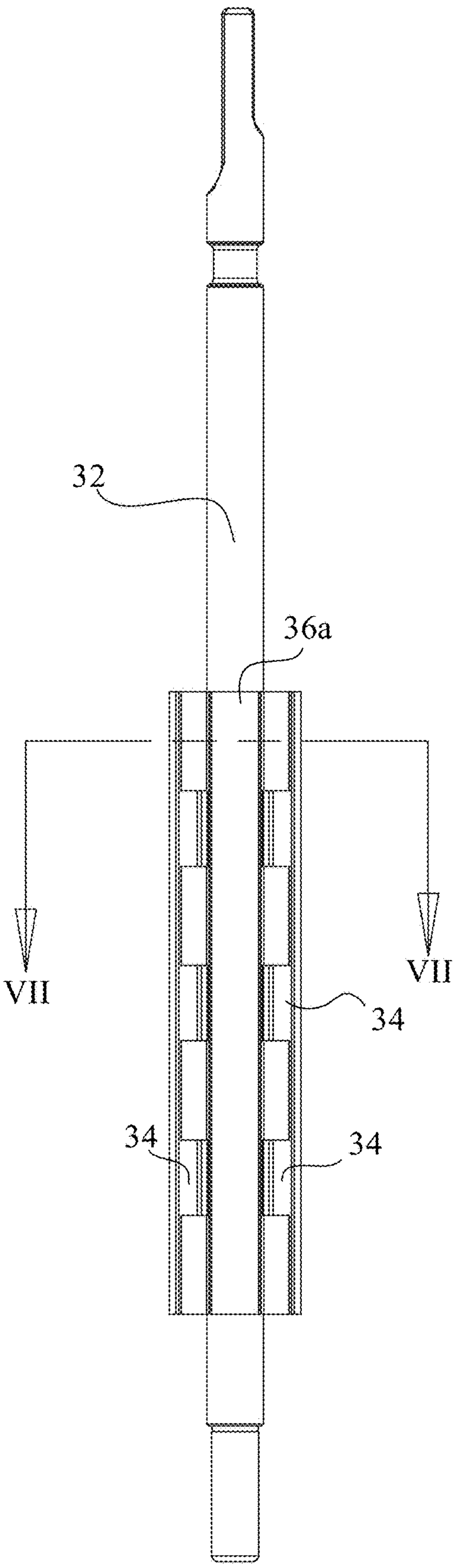
FIG. 6 is a front structural schematic view of the rotor assembly in FIG. 5.

In the embodiments, the circuit board 41 is configured to process a signal received by the Hall sensors 42 and transmit the signal to a next level of control unit; the magnetic marker 50 may be the magnets 36*a*, 36*b* on the rotor assembly 30, or magnetic attraction pieces located on an outside of a bearings as shown in FIGS. 3 and 4. The above design may make the above elements far away from the stator assembly 20 and generate a targeted magnetic field, thereby making the magnetic detection more accurate.

Further, the detection assembly 40 is disposed on a rear end of the housing 10, and the housing 10 defines a lead hole 11 between the detection assembly 40 and the stator assembly 20; the lead hole 11 is configured for leads of the detection assembly 40 and the stator assembly 20 to pass out of the housing 10, which may shorten the distance of the leads and facilitate fixing of the motor 100, i.e., it is more convenient to utilize the rear end surface of the motor 100 to fix the motor 100.

The present disclosure further proposes a motor 100 for a portable electronic device, including a housing 10, a stator assembly 20, and a rotor assembly 30; where the rotor assembly 30 may be as described above. The specific structure of the rotor assembly 30 is referred to in the above embodiments, and since the present motor 100 utilizes all of the technical solutions of all of the above embodiments, it likewise has all of the beneficial effects brought about by the technical solutions of the above embodiments, which will not be repeated herein. In the embodiments, the portable electronic device may be an electric toothbrush, a hair dryer, a small vacuum cleaner, and the like; the housing 10 is configured to provide support as well as protection for components inside the housing 10, and the stator assembly 20 typically includes a winding frame and a coil winding wound on the winding frame.

The present disclosure further proposes an electric toothbrush (not shown) including a handle, a motor 100, and a brush head; where the motor 100 is disposed in an inner cavity of the handle, the center shaft 32 of the rotor assembly 30 extends to a front end of the handle, and the brush head is arranged on a front end of the center shaft 32; the motor 100 may be as described above. The specific structure of the motor 100 is referred to in the above-described embodiments, and since the present electric toothbrush utilizes all of the technical solutions of all of the above embodiments, it likewise has all of the beneficial effects brought about by the technical solutions of the above embodiments, which will not be repeated herein. In the embodiment, the handle is generally arranged into an elongated shape that is convenient to hold, and the brush head may be detachably fixed to the center shaft 32.

Finally, it should be noted that the above embodiments are only used to illustrate the technical solutions of the present disclosure, and not to limit them; although the present disclosure has been described in detail with reference to the foregoing embodiments, a person of ordinary skill in the art should understand that it is still possible to make modifications to the technical solutions documented in the foregoing embodiments, or to make equivalent substitutions for some of the technical features therein; and such modifications or substitutions do not cause the essence of the corresponding technical solutions to depart from the essence of the various embodiments of the present disclosure. These modifications or substitutions do not cause the essence of the technical solutions to depart from the spirit and scope of the technical solutions of the embodiments of the present disclosure.

What is claimed is:

1. A rotor holder, comprising:

a center shaft; and a mounting portion, protruding from an outer peripheral surface of the center shaft; wherein a surface of the mounting portion away from the center shaft defines a plurality of accommodation slots spaced around an axis of the center shaft;

wherein the surface of the mounting portion away from the center shaft further defines a material reduction slot, and a bottom of the material reduction slot extends around the axis of the center shaft and passes through a bottom wall surface of each of the plurality of accommodation slots.

2. The rotor holder according to claim 1, wherein the material reduction slot extends around the axis of the center shaft in a full circle and is in an annular shape.

3. The rotor holder according to claim 2, wherein a bottom wall surface of the material reduction slot is a rotary surface coaxial with the center shaft.

4. The rotor holder according to claim 3, wherein the bottom wall surface of the material reduction slot is a cylindrical surface.

5. The rotor holder according to claim 4, wherein an outer diameter of the bottom wall surface of the material reduction slot is R1, and an outer diameter of a shaft section of the center shaft near the mounting portion is R2, with R1 being greater than or equal to R2.

6. The rotor holder according to claim 5, wherein a minimum distance between each adjacent two of the plurality of accommodation slots in a circumferential direction extending around the axis of the center shaft is D1, and a minimum distance from the bottom wall surface of each of the plurality of accommodation slots to the outer peripheral surface of the center shaft is D2, with D1 being greater than D2.

7. The rotor holder according to claim 6, wherein the mounting portion comprises a plurality of silicon steel sheets affixed along the axis of the center shaft, D2 being greater than or equal to 5 mm.

8. The rotor holder according to claim 1, wherein the mounting portion and the center shaft are in a one-piece structure.

9. The rotor holder according to claim 8, wherein a length of the mounting portion is L1, a distance between a front end surface of the mounting portion and a front end surface of the center shaft is L2, and a value of L1:L2 is in a range of [0.8, 2.5].

10. The rotor holder according to claim 9, wherein the front end surface of the mounting portion is arranged with a chamfer at a connection with the outer peripheral surface of the center shaft.

11. The rotor holder according to claim 1, wherein the material reduction slot comprises a plurality of material reduction slots spaced apart along the axis of the center shaft.

12. The rotor holder according to claim 11, wherein the plurality of material reduction slots are arranged at equal intervals along the axis of the center shaft.

13. The rotor holder according to claim 12, wherein an axial width of each material reduction slot is equal.

14. The rotor holder according to claim 13, wherein the axial width of each material reduction slot is W1, and a spacing between each adjacent two of the plurality of material reduction slots in a direction extending along the axis of the center shaft is W2, with W1 being less than W2.

15. The rotor holder according to claim 12, wherein axial widths of the plurality of material reduction slots are set decreasing from front to back.

16. The rotor holder according to claim 11, wherein the plurality of material reduction slots are numerically arranged densely in front and sparsely in back along the axis of the center shaft.

17. A rotor assembly, comprising:

the rotor holder according to claim 1 and a plurality of magnets; wherein the plurality of magnets are fixedly disposed in the plurality of accommodation slots, the plurality of magnets cover a portion of the material reduction slot, and the plurality of magnets are spaced apart from a bottom wall surface of the material reduction slot.

18. The rotor assembly according to claim 17, wherein each of the plurality of accommodation slots extends along the axis of the center shaft in an elongate shape and passes through a front end surface and/or a rear end surface of the mounting portion, and the plurality of magnets are axially assembled in the plurality of accommodation slots.

19. The rotor assembly according to claim 18, wherein each accommodation slot is arranged with some of the plurality of magnets spliced in an axial direction.

20. The rotor assembly according to claim 17, wherein a splicing seam of each adjacent two of the plurality of magnets in a direction extending along the axis of the center shaft is set off from the material reduction slot.

21. The rotor assembly according to claim 19, wherein an axial length of the some of the plurality of magnets is greater than an axial length of a corresponding accommodation slot, and the some of the plurality of magnets protrude from the front end surface and/or a rear end surface of the mounting portion along the axial direction.

22. The rotor assembly according to claim 17, wherein the rotor assembly further comprises a filler disposed in the material reduction slot, a density of the filler being less than a density of the mounting portion.

23. The rotor assembly according to claim 22, wherein an outer side of each of the plurality of magnets protrudes from an outer peripheral surface of the mounting portion, and an outer surface of the filler is flush with the outer peripheral surface of the mounting portion.

24. The rotor assembly according to claim 22, wherein the filler is an adhesive that securely connects the plurality of magnets to the mounting portion.

25. A motor, comprising: a housing, a stator assembly, and the rotor assembly according to claim 17.

26. The motor according to claim 25, wherein the motor further comprises a detection assembly, the detection assembly comprising a circuit board and a plurality of Hall sensors electrically connected to the circuit board; wherein the plurality of Hall sensors are coupled to a magnetic marker on the rotor assembly.

27. The motor according to claim 26, wherein the detection assembly is disposed on a rear end of the housing, and the housing defines a lead hole between the detection assembly and the stator assembly; the lead hole is configured for leads of the detection assembly and the stator assembly to pass out of the housing.

28. An electric toothbrush, comprising: a handle, the motor according to claim 25, and a brush head; wherein the motor is disposed in an inner cavity of the handle, the center shaft of the rotor assembly extends to a front end of the handle, and the brush head is arranged on a front end of the center shaft.

* * * * *